(12) United States Patent
Harvey

(10) Patent No.: US 9,995,824 B2
(45) Date of Patent: Jun. 12, 2018

(54) METHODS AND SYSTEM TO ASSIST SEARCH FOR LOST AND SUBMERGED OBJECTS

(71) Applicant: Thomas Danaher Harvey, Rockville, MD (US)

(72) Inventor: Thomas Danaher Harvey, Rockville, MD (US)

(*) Notice: Subject to any disclaimer, the term of this patent is extended or adjusted under 35 U.S.C. 154(b) by 39 days.

(21) Appl. No.: 14/469,825

(22) Filed: Aug. 27, 2014

(65) Prior Publication Data

US 2015/0098304 A1 Apr. 9, 2015

Related U.S. Application Data

(60) Provisional application No. 61/977,227, filed on Apr. 9, 2014.

(51) Int. Cl.
*G01S 15/00* (2006.01)
*G01S 15/74* (2006.01)
*G01S 5/18* (2006.01)
*B63C 11/48* (2006.01)

(52) U.S. Cl.
CPC .............. *G01S 15/74* (2013.01); *G01S 5/183* (2013.01); *B63C 11/48* (2013.01)

(58) Field of Classification Search
USPC .......................................................... 367/118
See application file for complete search history.

(56) References Cited

U.S. PATENT DOCUMENTS

| | | | | |
|---|---|---|---|---|
| 3,864,662 A | * | 2/1975 | David et al. ...................... 367/6 |
| 4,058,809 A | * | 11/1977 | Chudleigh, Jr. .... G01S 13/5242 |
| | | | | 342/161 |
| 4,185,326 A | * | 1/1980 | Whittaker ........................ 367/96 |
| 4,198,703 A | * | 4/1980 | Huisveld et al. ................. 367/1 |
| 4,972,385 A | * | 11/1990 | Teel ................................ 367/99 |

(Continued)

OTHER PUBLICATIONS

Towed Pinger Locator 25 Specifications published by Phoenix International www.phnx-international.com. No author or date included. Retrieved from Internet Archive Wayback Machine on Apr. 18, 2015 <https://web.archive.org/web/20150315000000*/https://timedotcom.files.wordpress.com/2014/03/tpl-25_specsheet.pdf>, version of Sep. 16, 2015 at <https://timedotcom.files.wordpress.com/2014/03/tpl-25_specsheet.pdf>.

(Continued)

*Primary Examiner* — James R Hulka

(57) ABSTRACT

Devices and methods for aiding a large area search for submerged objects such as aircraft. A searcher transmits interrogation signals to be received by a device at the target object. The interrogation signals have a long range relative to that of returned signals. The target device responds with a ping signal modified to be more easily found by means of information contained in the interrogation signal. The information may be inherent in the nature of the received signal or data encoded and embedded by the searching device. The target device may use a microprocessor to do complex operations using the information from the interrogation signal and other information. Detection of a weak ping is facilitated by such means as being beamed in the direction of the interrogation, arriving at a predictable time, or having parameters adapted to values requested by the searcher.

20 Claims, 7 Drawing Sheets

(56) References Cited

U.S. PATENT DOCUMENTS

| | | | |
|---|---|---|---|
| 5,582,566 A | 12/1996 | Imasaka | |
| 5,659,520 A * | 8/1997 | Watson et al. | 367/125 |
| 6,469,654 B1 | 10/2002 | Winner | |
| 6,721,234 B2 * | 4/2004 | Thomas | 367/127 |
| 6,802,236 B1 * | 10/2004 | Richardson | 89/1.13 |
| 6,813,218 B1 * | 11/2004 | Antonelli et al. | 367/3 |
| 6,935,434 B1 * | 8/2005 | Easton | A01B 63/00 172/439 |
| 7,382,687 B2 * | 6/2008 | Doolan | 367/118 |
| 7,479,884 B1 * | 1/2009 | Fullerton | G01S 13/003 340/572.1 |
| 7,646,330 B2 | 1/2010 | Karr | |
| 8,400,353 B2 * | 3/2013 | Tarlow | G01S 19/22 342/357.58 |
| 8,624,774 B2 | 1/2014 | De Rosa | |
| 9,363,645 B2 * | 6/2016 | Lavery | G01S 5/021 |
| 9,622,324 B2 * | 4/2017 | Hartman | H05B 37/0227 |
| 2003/0197644 A1 * | 10/2003 | Paquelet | G01S 3/52 342/451 |
| 2005/0099892 A1 * | 5/2005 | Greelish | 367/129 |
| 2005/0146985 A1 * | 7/2005 | Doolan | 367/118 |
| 2007/0055630 A1 * | 3/2007 | Gauthier | G06Q 20/24 705/44 |
| 2008/0037370 A1 * | 2/2008 | Crowell | 367/127 |
| 2008/0165059 A1 * | 7/2008 | Karr | 342/378 |
| 2008/0165617 A1 * | 7/2008 | Abbot et al. | 367/3 |
| 2008/0318625 A1 * | 12/2008 | Rofougaran | G01S 7/412 455/556.1 |
| 2009/0196122 A1 * | 8/2009 | Crowell | 367/127 |
| 2009/0201763 A1 * | 8/2009 | Jones et al. | 367/5 |
| 2009/0207694 A1 * | 8/2009 | Guigne et al. | 367/127 |
| 2010/0159758 A1 * | 6/2010 | Tjom | 441/2 |
| 2010/0231445 A1 * | 9/2010 | Tarlow | G01S 19/22 342/357.28 |
| 2011/0018687 A1 * | 1/2011 | Holm | 340/10.1 |
| 2011/0034094 A1 * | 2/2011 | Biousse | 441/2 |
| 2011/0088474 A1 * | 4/2011 | Jones et al. | 73/602 |
| 2011/0148710 A1 * | 6/2011 | Smid et al. | 342/394 |
| 2011/0228820 A1 * | 9/2011 | De Rosa | 375/147 |
| 2011/0255374 A1 * | 10/2011 | Kuklinski et al. | 367/99 |
| 2012/0081247 A1 * | 4/2012 | Kemkemian | G01S 13/4463 342/29 |
| 2012/0092964 A1 * | 4/2012 | Badiey et al. | 367/127 |
| 2013/0070556 A1 | 3/2013 | Huskamp | |
| 2013/0215806 A1 * | 8/2013 | Uno | 370/281 |
| 2013/0242103 A1 * | 9/2013 | Schraga | G01S 7/4017 348/148 |
| 2013/0242704 A1 * | 9/2013 | Strat | 367/137 |
| 2013/0272098 A1 * | 10/2013 | Cahalan et al. | 367/134 |
| 2014/0225772 A1 * | 8/2014 | Tarlow | G01S 19/22 342/357.51 |
| 2015/0141044 A1 * | 5/2015 | Hartman | G08G 1/087 455/456.1 |

OTHER PUBLICATIONS

Final Report: Underwater Location Beacon Detection Ranges for Fuselage Encapsulated Recorders. Federal Aviation Administration Report No. NA-68-7, Jul. 1968. Prepared by: R. Byron Fisher, Paul M. Rich. Relevant material on p. 6 of file which is report p. 1. file pp. 1-7 of 63 submitted. Retrieved from <http://www.fire.tc.faa.gov/pdf/na68-7.pdf> Sep. 16, 2015.

* cited by examiner

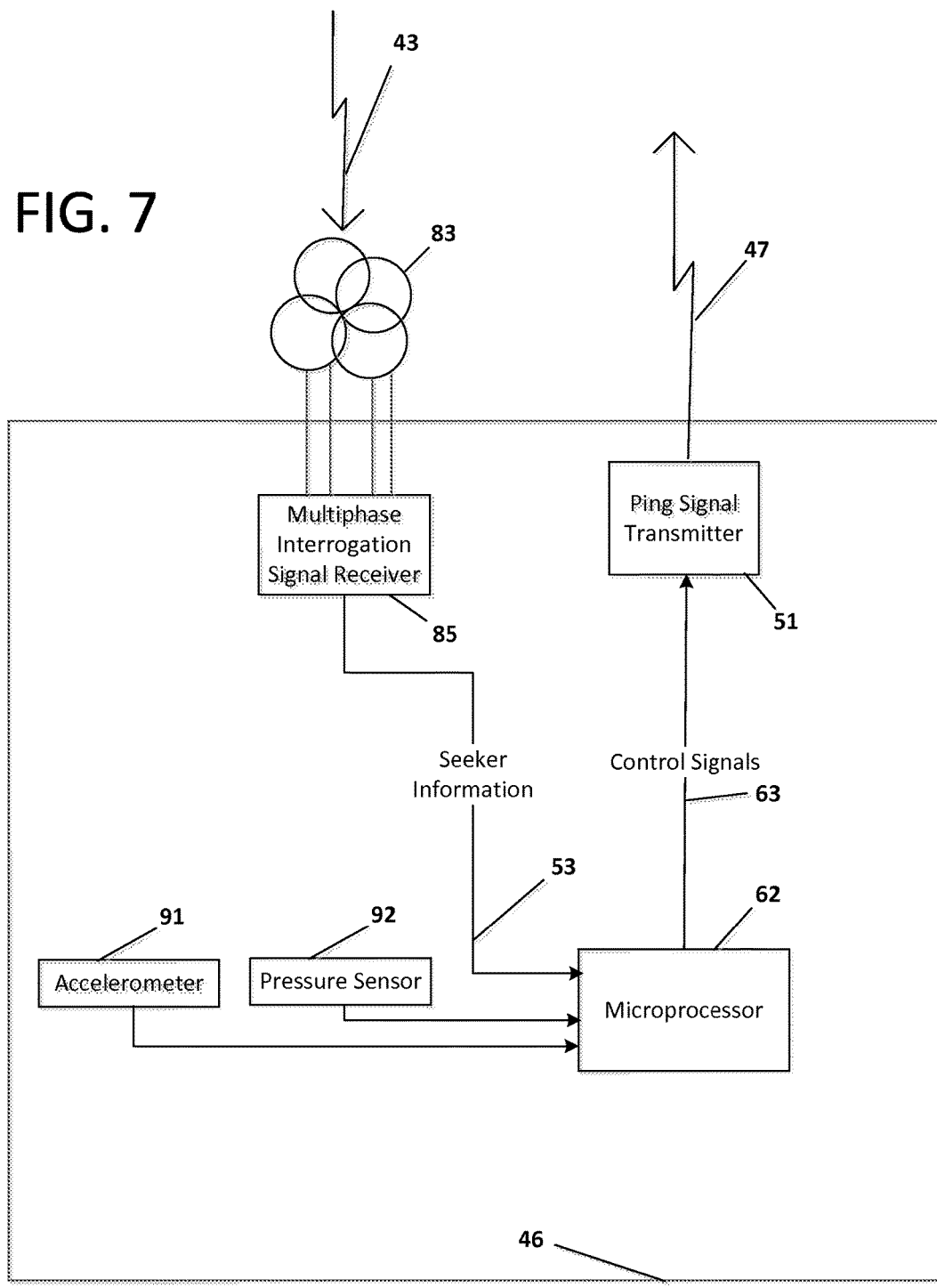

METHODS AND SYSTEM TO ASSIST SEARCH FOR LOST AND SUBMERGED OBJECTS

CROSS REFERENCE TO RELATED APPLICATIONS

This application claims the benefit of provisional patent application Ser. No. 61/977,227 filed Apr. 9, 2014 by the present inventor.

STATEMENT REGARDING FEDERALLY SPONSORED RESEARCH OR DEVELOPMENT

Not Applicable

BACKGROUND OF THE INVENTION

Field of the Present Invention

The field of the present invention is aircraft safety investigation in conjunction with vehicle navigation and relative location.

Background Concerning the Need and Use of the Current Invention

Aircraft lost over water are often extremely difficult to locate. Location is important because data and voice information recorded on the vehicle and physical evidence from the wrecked vehicle are essential to investigation of the cause of the loss. Larger aircraft are currently required to carry acoustic pingers attached to their recording devices that are intended to allow searchers to locate not only the recording device but the lost aircraft itself. Because of the vast spaces in large bodies of water such as oceans, the initial discovery of even the approximate location is the crucial step. The search can take a long time and the power source of the pinger is subject to exhaustion before this step is accomplished. Because of limitations concerning space, weight and power conservation the range of pinger devices is limited. This limitation is a major factor in the difficulty of location.

The current invention is directed to a solution of this difficulty. Because a searcher can use substantial and renewable power resources, it is possible to broadcast a signal from the searcher to the pinger device with much greater ease and at a much greater range than from the pinger to the searcher. Even before the searcher has made any discovery that the pinger is in its neighborhood, the pinger can be enabled to modify the ping signal on the basis of information gained from the receipt of the broadcast interrogation signal. Doing this in a way that increases the ability of the searcher to discover the hard to find ping signal is a solution to this difficult location problem and the principle subject of the current invention.

This is distinct from just making a more effective pinger, because it works in the phase of the search where one way communication only is established and uses that communication to facilitate discovery. There are many ways the ping signal can be modified for this purpose. Some of them are described in the embodiments disclosed. The most salient ones include timing the ping to arrive at a time predictable by the searcher, beaming the ping in the direction from which the interrogation signal arrived and implementing the ping with parameters requested by the searcher. This last method is important because the searcher with its greater resources may know its own best modes of search and have current information about the search environment. If information based on that is broadcast and received by the pinger device, then the ping can be adapted with the benefit of information available to either the searcher or the pinger.

There are many kinds of information that can be taken from the interrogation signal for the purpose of determining the best mode of transmitting pings. First, there is the fact of receipt of the interrogation signal itself, distinct from any information about the nature of the signal. This can initiate pinging or wake up portions of the pinger device. This is primarily a way of conserving power to enable a more robust energy budget for powerful pinging and for extending the life of the power source. Second, the ping device can measure parameters of the incoming interrogation signal such as the intensity and the direction of arrival. This has many uses in determining the best mode of pinging. Third, the search device can encode and embed information in the interrogation signal. This can carry useful information about the location of the searcher, time of transmission of the interrogation signal, ping characteristics requested by the searcher, the current search environment and other things known to the searcher.

Existing systems using transceiver technology often have interactive methods of facilitating communication, but they do not use the ability to broadcast into a large space in an effort to locate a difficult to detect responder having the ability to tailor its response on the basis of the interrogation. They, especially, do not use this technology as the basis of an extended long term search for an object requiring a large number of interrogations from different locations to have a significant chance of being located.

Prior Patents to be Distinguished from the Current Inventive Concept

US Patent Application 2013-0070556 to Huskamp discloses a system for reflecting acoustic signals directed to a sunken aircraft. It contemplates passive reflectors with specific frequency characteristics to allow identification of the reflected signals without use of power allowing unlimited life. If differs from the current invention in not having a signal receiver and a signal transmitter and in not modifying the return signal.

U.S. Pat. No. 5,582,566 (A) to Imasaka concerns a transponder which returns a signal with a fixed delay. The delay is used to provide an offset to the distance measurement for a device using the transponder. This invention is not concerned with lost or submerged objects and does not vary the return signal.

U.S. Pat. No. 6,469,654 (B1) to Winner concerns a transponder landing system and discusses a protocol for increasing the accuracy of tracking the transponder. It discusses a "Dual Diversity Antenna System" in the background section wherein a transponder with two antennas returns a signal using only the antenna which receives the stronger interrogation signal. This differs from the current invention in that it is not concerned with lost or submerged objects as herein defined. The purpose is to maintain continuous and reliable communication during maneuvers of the aircraft. The selection of the antenna for response is not a variation of a parameter of the ping signal as herein defined; because the antenna selection is not done to vary the signal in any way, but is done specifically to maintain an unvarying signal despite changes in the attitude of the aircraft.

U.S. Pat. No. 7,646,330 (B2) to Karr concerns a two way communication system where the remote transponder makes its return signal coherent with the interrogation signal. It describes a wake-up process to periodically listen for interrogations, which is distinct for a low power listening mode. The purpose of this system is to provide reliable two way communication of identification codes and other information with very low power use by the remote device and not to provide initial discovery of the remote device by the interrogating device. It is not concerned with lost or submerged objects as herein defined.

U.S. Pat. No. 8,624,774 (B2) to De Rosa concerns a device to locate an associated device. It uses a low power listening receiver to wake up the device on receipt of an interrogation. It is not concerned with lost or submerged objects as herein defined. The patent is directed to a method of measuring the relative locations of the device and making this information available to the search device.

The differences described above between the current inventive concept and the patents cited are only illustrative and there are many other distinctions in each case.

Prior Patent for Reference

The patent in this section is referenced to provide clarity to the use of various technologies used in the embodiments described herein and to provide further enablement in the implementation of those embodiments.

The patent listed in this section is incorporated herein by reference in its entirety. Furthermore, where a definition or use of a term in a reference, which is incorporated by reference herein, is inconsistent or contrary to the definition of that term provided herein, the definition of that term provided herein applies and the definition of that term in the reference does not apply.

U.S. Pat. No. 4,613,864 (A) to Hofgen describes the use of one way ranging from multiple locations to calculate the relative location of a user device from the signals of multiple satellites. This is the basic technology of GPS systems. The technology is here used in an embodiment to calculate the relative location of a target device to a moving search device on the basis of the receipt of multiple interrogation signals.

BRIEF SUMMARY OF THE INVENTION

The present invention is directed to methods and devices for locating a object lost in a space which is large in comparison to the range of an associated signaling device. The object is submerged in a medium denser than air. A searching device which is looking for the lost object sends interrogating signals from many successive positions which are typically able to be received at long ranges because of the availability of a large or renewable power source such as the power generated by a ship or other vehicle carrying the search device.

The broadcast search signal when received provides a target device with information about the search device that is attempting to detect a ping signal transmitted from the target device. The information may be inherent in the nature of the interrogation signal, embedded as data in the signal or simply the presence of an interrogation signal. The information may be combined with local sensor information and changed by a local microprocessor, but remains a function of information from the interrogation signal. The ping signal is modified on the basis of this information to allow detection with greater probability or at a greater range.

The information received by the target device includes signal characteristics such as signal strength and direction. The processing may include decoding embedded location data, combining multiple interrogation signals, calculating direction of signals from phase data and calculation of signal transit times. The modification of the ping signals may include producing signals with parameters requested by the search device, beaming the signal in the direction of the search device, or sending signals timed to arrive in a window predictable by the search device. Certain embodiments may use interrogation information including the mere arrival of an interrogation signal to conserve power by not transmitting ping signals unlikely to be detected.

BRIEF DESCRIPTION OF THE SEVERAL VIEWS OF THE DRAWING

The features and advantages of the various embodiments disclosed herein will be better understood with respect to the following drawings in which:

FIG. 7 shows a block diagram of an embodiment which uses multiple sensors to determine the direction of an interrogation signal. It has a microprocessor which combines information, which is here seeker information but not embedded seeker information, with information from local sensors to calculate the relative positions of the search device and the target device. It then calculates the transit time of a ping enabling the transmission of the ping to be scheduled to arrive at a predetermined delay from the transmission of the interrogation signal. It shows an interrogation signal 43, a target device 46, ping signal 47, a ping signal transmitter 51, transfer of seeker information 53, a microprocessor 62, control signals 63, an interrogation signal multi-sensor 83, a multiphase interrogation signal receiver 85, an accelerometer 91, and a pressure sensor 92.

DETAILED DESCRIPTION OF THE INVENTION

Definitions

Figure 1:
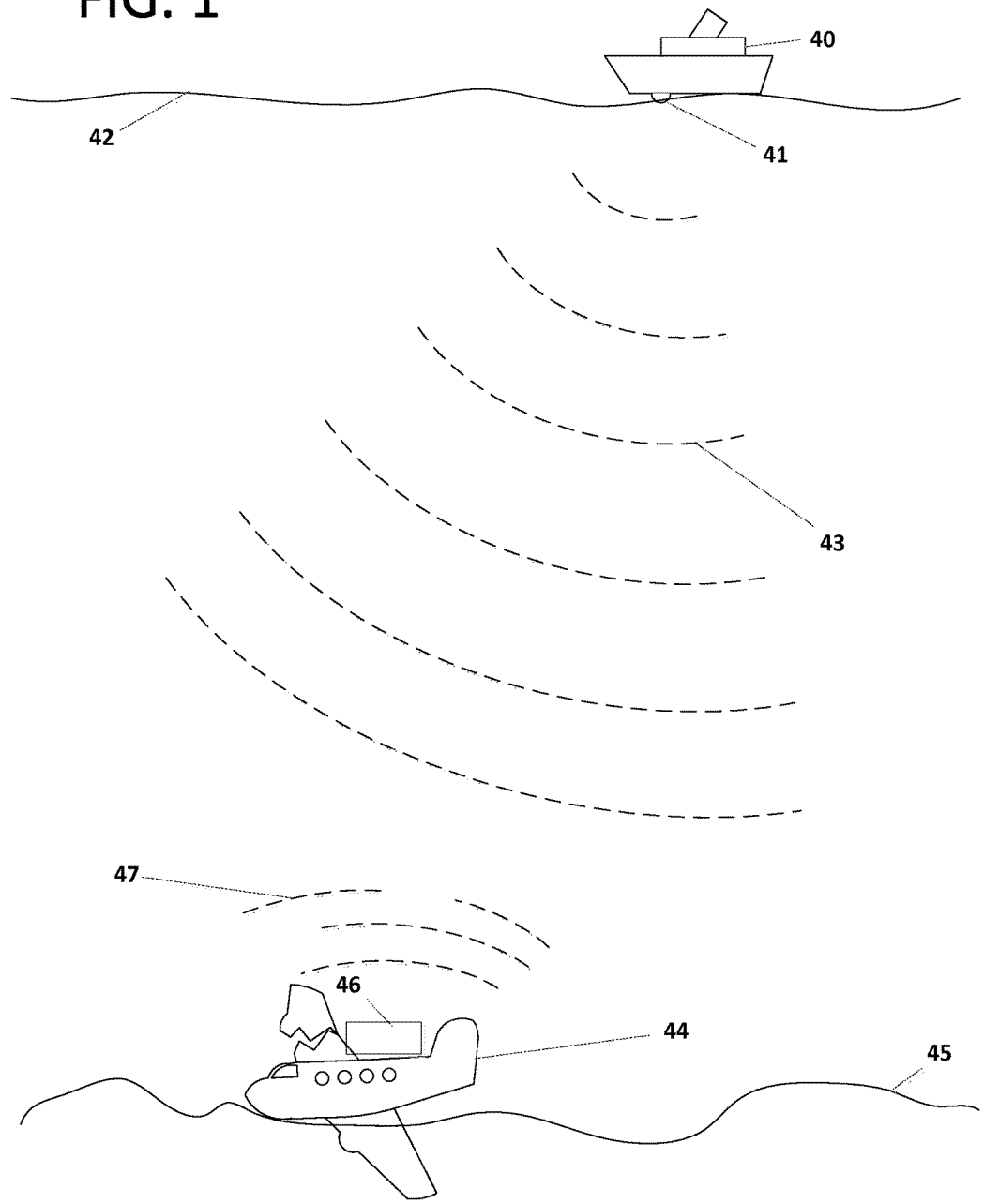
FIG. 1 is an overall elevation of an embodiment and the situation in which it is employed. It shows a search vessel 40, a search device 41, the surface of a large body of water 42, interrogation signals 43, a lost object which in this case is a crashed aircraft 44, the bottom of the body of water 45, a target device 46, and a ping signal 47.

Embedded seeker information, throughout this specification and in the claims, refers to information that is encoded in the interrogation signal by the search device. It may be used by the target device to determine one or more parameters of the ping signal. It may include the time of transmission, location of the search device, ping parameter values known to the search device to be effective in a particular situation, a description of environmental variables, a description of the search device, or other information.

Interrogation signal, throughout this specification and in the claims, refers to a signal broadcast by a search device or by a device associated with one or more search devices. The signal is intended to inform a target device of the presence of the search device or to pass information to the target device to be used to initiate or modify the transmission of ping signals. An interrogation signal may be implemented by acoustic or electromagnetic waves including visible or invisible light waves.

Interrogation signal information, throughout this specification and in the claims, refers to information that is embedded seeker information, seeker information, the fact of receipt of an interrogation signal, or a combination thereof.

Lost object, throughout this specification and in the claims, refers to an object being searched for with an expectation that hundreds or more of interrogation signals from different locations will be required to successfully detect a ping signal in response and whose location is unknown in a region that is substantially larger in at least one dimension than the range at which a ping signal can be detected.

Microprocessor, throughout this specification and in the claims, includes any computer and non-computer circuitry with a complexity requiring at least 100 logical gates for implementation.

Parameters of the interrogation signal, throughout this specification and in the claims, are measurements made at the target device of one or more of (a) arrival time relative to a known or estimated transmission time or relative arrival time of different components of the interrogation signal, (b) signal strength, (c) signal direction or (d) other characteristics of the interrogation signal to be used to determine one or more parameters of the ping signal. The fact of receipt of an interrogation signal in itself is specifically excluded in this definition from being a parameter of the interrogation signal.

Parameters of a ping signal, throughout this specification and in the claims, refers to time of transmission; frequency; pulse timing, length, and shape; embedded data; embedded identification; direction of emission; amplitude; and other characteristics of the signal that may affect the probability of detection, range of detection, or the ease of detection of the ping signal.

Ping signal, throughout this specification and in the claims, refers to a signal emitted by a target device to be detected by a search device. Successful detection and identification of a ping signal at least approximately locates the target device. After detection of a ping signal the search device may continue to attempt to detect additional ping signals or other search methods may be enabled after the approximate location is determined. A ping signal may be implemented by sound or electromagnetic waves including visible or invisible light waves.

Seeker information, throughout this specification and in the claims, refers to one or more of embedded seeker information or of interrogation signal parameters, Search device, throughout this specification and in the claims, means a device to detect a ping signal.

Submerged object, throughout this specification and in the claims, refers to an object which is covered by material denser than air which impedes its discovery or location by means more convenient than detecting a ping signal. The material may be water but may also be other continuous or discontinuous, liquid or solid substances such as snow, ice, mud, earth, rock or rubble. It may limit the approach of a search device to areas outside the material and, thereby, require a minimum detection range for successful detection.

Target device, throughout this specification and in the claims, means a device associated with the searched for object. The target device receives interrogation signals and emits ping signals.

Detailed Description of the Drawing and Certain Embodiments

Referring to FIG. 1, an embodiment is depicted in which the lost and submerged object is an aircraft 44 which is located at the bottom 45 of a large and deep body of water with a surface 42. A search vessel 40 carries search device 41 which emits acoustic interrogation signals 43 to be received by a target device 46. The target device responds with acoustic ping signals 47 to be received by the search device. The interrogations have a long range because the search vessel can supply a large amount of power for their generation, but the ping signals have a limited range because of the limited power available to the target device. The aircraft is a lost object because its location is unknown and the range of the ping signals is much smaller than the dimensions of the body of water. The aircraft is a submerged object because it is covered by a body of water that prevents its location by longer range and more convenient methods such as visual search or exchange of radio signals. The search vessel moves about the surface to locate the aircraft and if a ping signal is identified the aircraft is discovered to be in a region limited at least by the range of the ping signal and smaller than the entire body of water.

Figure 2:
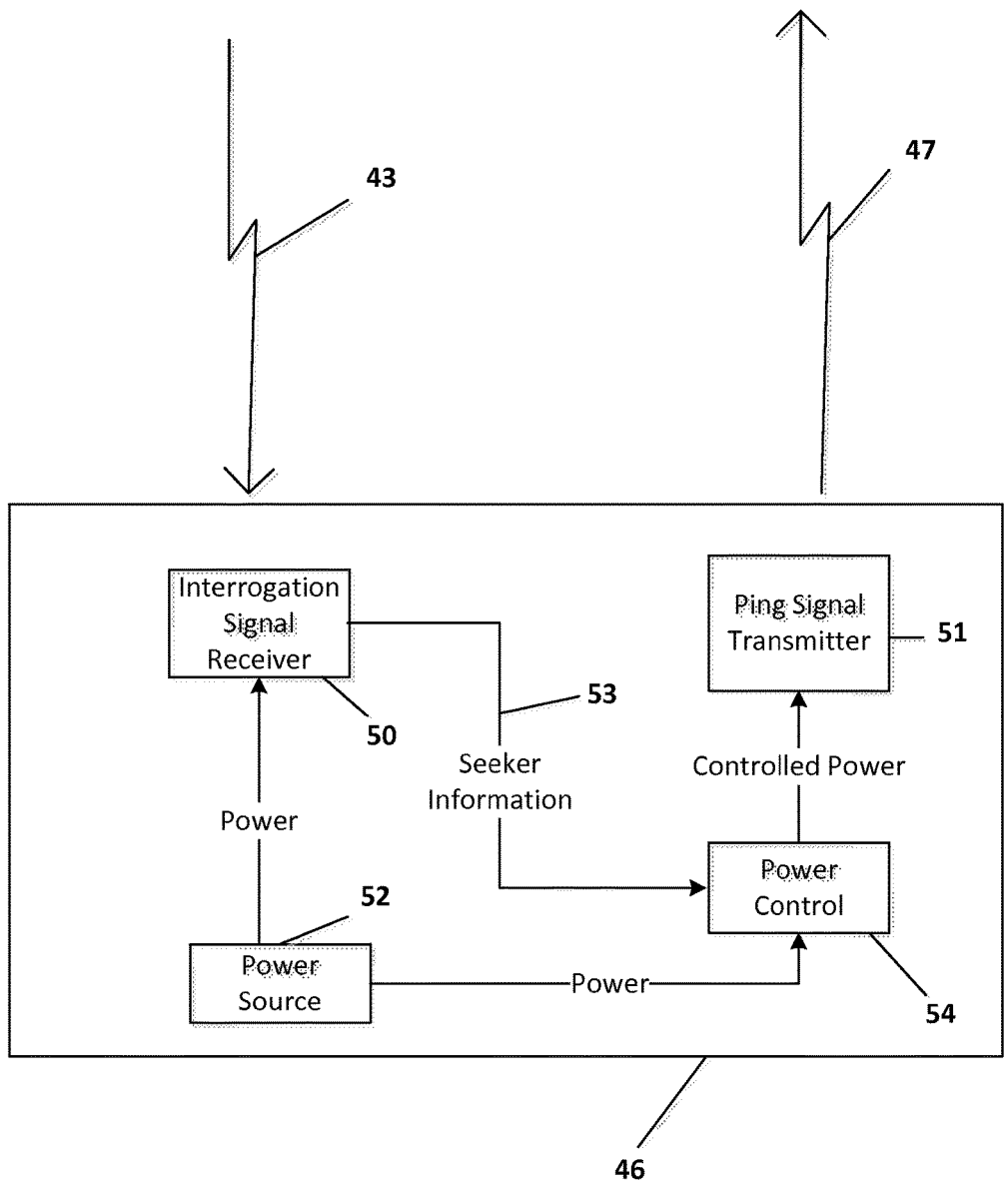
FIG. 2 is a block diagram of the target device of an embodiment which is suitable for the situation of FIG. 1. It shows an interrogation signal 43, a target device 46, a ping signal 47, an interrogation signal receiver 50, a ping signal transmitter 51, a power source 52, transfer of seeker information 53, and a power control 54.

FIG. 2 is a block diagram of the target device which depicts other details of this embodiment. A interrogation signal receiver 50 located at the target device with a power source 52 receives an interrogation signal 43. The receiver is equipped with circuitry to measure parameters of the interrogation signal and produces an interrogation signal value 53 which is supplied to power control circuitry 54 controlling the power level of the transmitter 51. The receiver and transmitter of FIG. 2 are equipped respectively with suitable a suitable sensor and transducer to receive and emit signals. In one contemplated embodiment depicted in this figure the parameter of the interrogation signal measured is the intensity of the received signal and the power control varies the power level of the ping signal to facilitate target device discovery by the search device while balancing this requirement with the requirement to conserve power usage to extend the life of the power source 52.

In this embodiment the circuitry to measure parameters of the interrogation signal is a means to extract seeker information. The interrogation signal value contains seeker information. In some related embodiments the circuitry consists of time measuring counters or clocks with appropriate gates to determine time relationships between different aspects of the signal. In other related embodiments the circuitry consists of measuring devices for physical aspects of the interrogation signal.

In another embodiment using the components depicted in FIG. 1 and FIG. 2, the ping signal is returned with a preestablished pattern of delays from the receipt of the interrogation signal. This pattern can be used by the search device to distinguish ping signals from other sources of periodic noise. Other embodiments include modulating the interrogation signal with periodic and non-periodic signals which can be detected by the interrogation signal receiver and used to modulate the ping signal with the same modulation or a modulation which is a function of that on the interrogation signal.

The embodiments listed here are not intended to be inclusive and it can easily be seen that there are many possible ways to modify the ping signal as a function of seeker information extracted from the interrogation signal in order to facilitate detection of the target module by the search device.

There are other embodiments similar to the one described above where a different parameter of the interrogation signal is measured or a different variation is made to the ping signal. For example, pulse duration of the ping signal may be extended to allow discovery by a search device at a greater range if the interrogation signal has a low intensity. Emission of ping signals may be suppressed or reduced to a low pulse frequency if interrogation signal intensity fails to exceed a predetermined threshold.

In another embodiment depicted in FIGS. 1 and 2 the interrogation signal receiver extracts information which is not seeker information. The receipt itself of an interrogation signal is defined above to not be seeker information or a parameter of the interrogation signal. It is defined to be interrogation signal information and is used in this embodiment to determine the timing of ping signals. This allows ping signals to be suppressed, delayed or transmitted with some other parameter chosen to conserve power until interrogation signals are received. This increases the probability that a ping signal would be received by insuring that power is available when the presence of a search device is indicated by the receipt of an interrogation signal. Other information may be combined with the interrogation signal information to make this determination by the target device.

Figure 3:
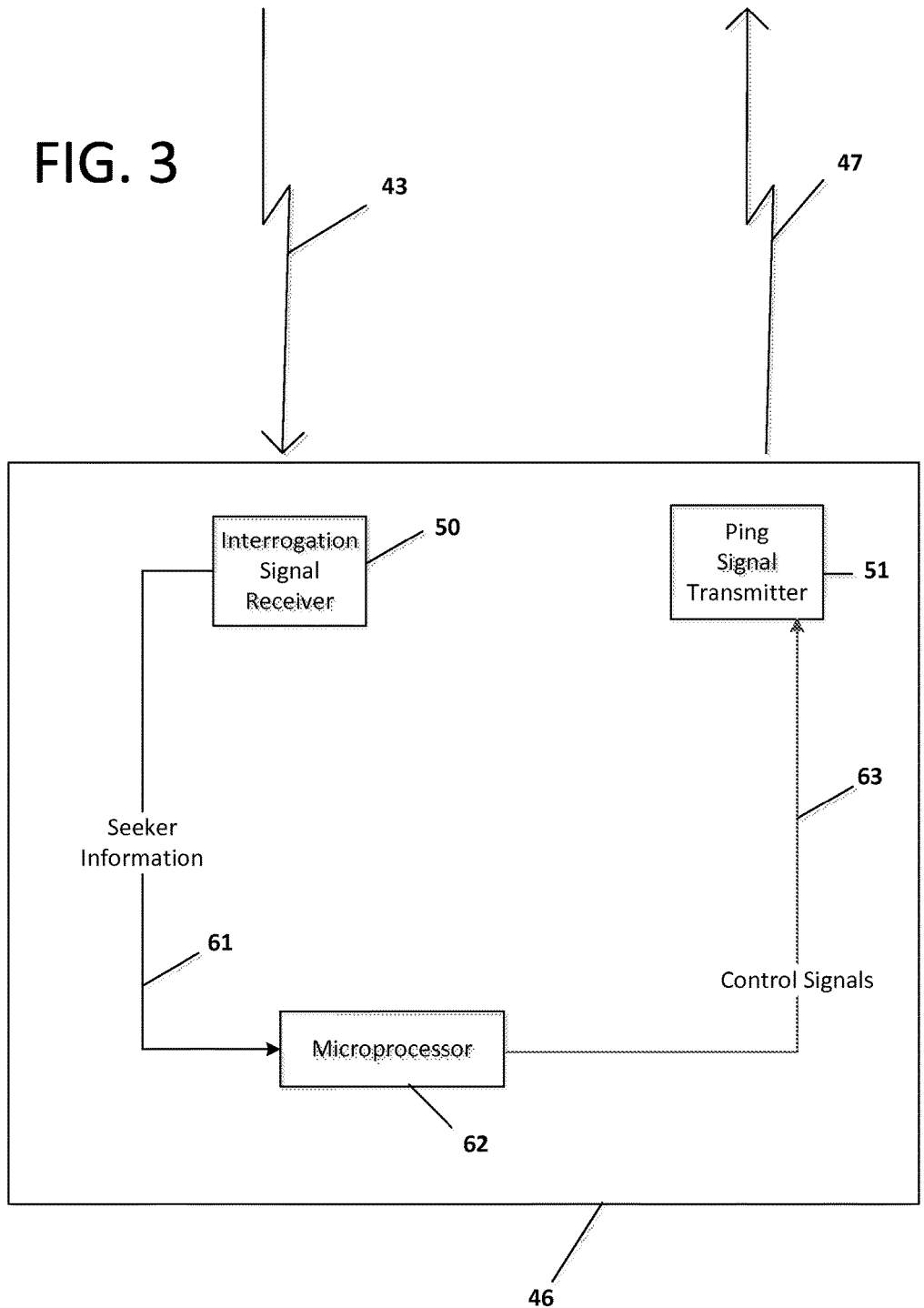
FIG. 3 is a block diagram of the target device of an embodiment which adds a microprocessor. It shows an interrogation signal 43, a target device 46, a ping signal 47, an interrogation signal receiver 50, a ping signal transmitter 51, transfer of seeker information 53, a microprocessor 62, and control signals 63.

FIG. 3 is a block diagram of the search device which adds a microprocessor to the components of FIG. 2. In a target device 46 an interrogation signal 43 is received by the interrogation signal receiver 50. The interrogation signal receiver passes seeker information 53 to the microprocessor 62. The microprocessor determines the values of parameters of the ping signal as a function of the seeker information and passes control signals 63 which will implement these parameters to the ping signal transmitter 51 which emits ping signals 47.

In this embodiment the receiver may contain circuitry to measure parameters of the interrogation signal serving as a means to extract seeker information or circuitry to decode digital information encoded in the interrogation signal serving as a means to extract embedded seeker information. In some related embodiments the circuitry consists of time measuring counters or clocks with appropriate gates to determine time relationships between different aspects of the signal. In other related embodiments the circuitry consists of measuring devices for physical aspects of the interrogation signal. In still other embodiments the circuitry comprises a separator to isolate an impeded coded signal from the interrogation signal with a decoder to provide decoded embedded seeker information to the microprocessor.

In one embodiment corresponding to FIG. 3, the interrogation signal contains an encoded request that the target device respond with ping signals of a certain frequency which has been determined by the search device to be relatively free of noise or otherwise especially suitable for ping detection. The interrogation signal receiver is equipped with circuitry to decode this request and pass it to the microprocessor. The microprocessor passes suitable control signals to the ping signal transmitter to emit pings at that frequency. In this way a ping signal parameter is modified as a function of the embedded seeker information in order to increase the probability and range of ping detection. There are contemplated other similar embodiments that receive different requests from the search device and modify different ping signal parameters such a ping signal repetition rate, ping signal duration or complex ping signal structure. These may be applied individually or in combination. In situations where there is a possibility of a signal from a source other than the target device being confused with a ping signal, the search device may request a variation in one or more parameters to eliminate or resolve that confusion.

Figure 4:
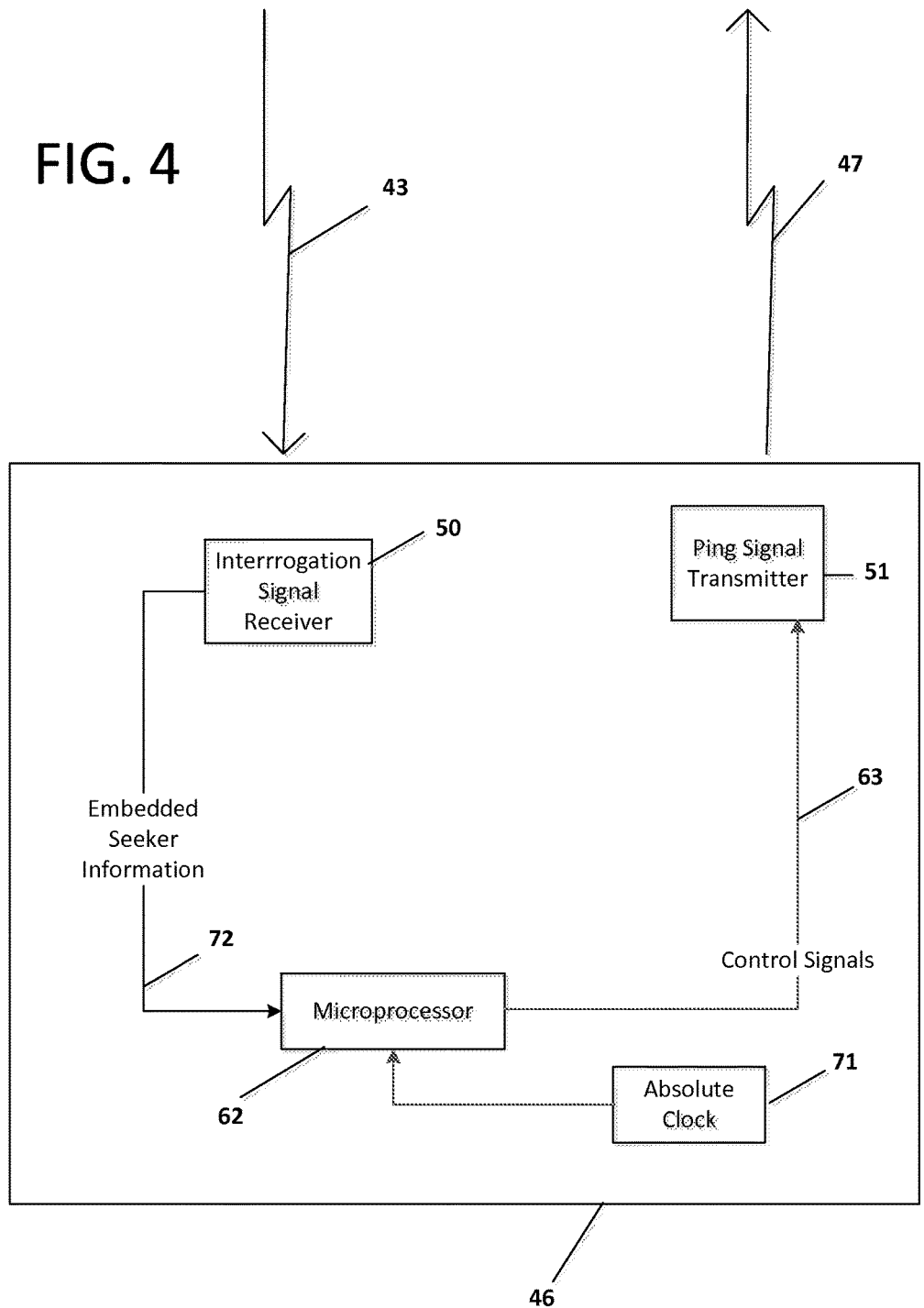
FIG. 4 is a block diagram of the target device of an embodiment which adds an absolute clock to the embodiment of FIG. 3. It also shows the use of embedded seeker information. It shows an interrogation signal 43, a target device 46, a ping signal 47, an interrogation signal receiver 50, a ping signal transmitter 51, a microprocessor 62, and control signals 63, an absolute clock 71, and transfer of embedded seeker information 72.

FIG. 4 is a block diagram of the target device which adds an absolute clock to the components of FIG. 3. In a target device 46 an interrogation signal 43 is received by the interrogation signal receiver 50. The interrogation signal receiver passes embedded seeker information 72 to the microprocessor 62. The microprocessor determines the values of parameters of the ping signal as a function of the seeker information and information received from the absolute clock 71 and passes control signals 63 which will implement these parameters to the ping signal transmitter 53 to the ping signal transmitter 51 which emits ping signals 47. The absolute clock maintains the current time on the basis of a prior synchronization made directly or indirectly with a clock available to the search device.

In one embodiment, corresponding to FIG. 4, the search device encodes the absolute time of emission of the interrogation signal into that signal. This embedded seeker information is received and passed to the microprocessor of the target device. The transit time of the interrogation signal pulse from the search device to the target device is calculated from the difference between the absolute clock times available to the two devices. A ping signal is then scheduled to be transmitted to arrive at the search device at a predetermined delay or at a predetermined absolute time calculated on the basis of equality or another assumed relationship between the transit times of interrogation and ping signals. In this way, the probability and range of ping detection is increased in this embodiment.

Despite not knowing the location of the target device or the transit time of signals between the target device and the search device, the search device is enabled by the predetermined time for arrival of ping signals to establish a specific time window to expect possible ping signals. Signals arriving outside of that time window may then be rejected as spurious and not genuine ping signals. The search devise is then able to apply increased sensitivity or relaxed filtering criteria of other kinds and still maintain the same ratio of spurious to genuine candidate ping signals.

Those skilled in the use of signal processing technology will see that the ability to apply a narrow time window to a signal without loss to the signal to be recognized will allow a substantial reduction in the noise obscuring the desired signal and will allow recognition of a signal of substantially less energy. Signal analysis software is here able to apply a narrow time window to the signal with a resulting reduction in signal obscuration by noise. This results in an increase in the range at which a signal has any given probability of detection.

Figure 5:
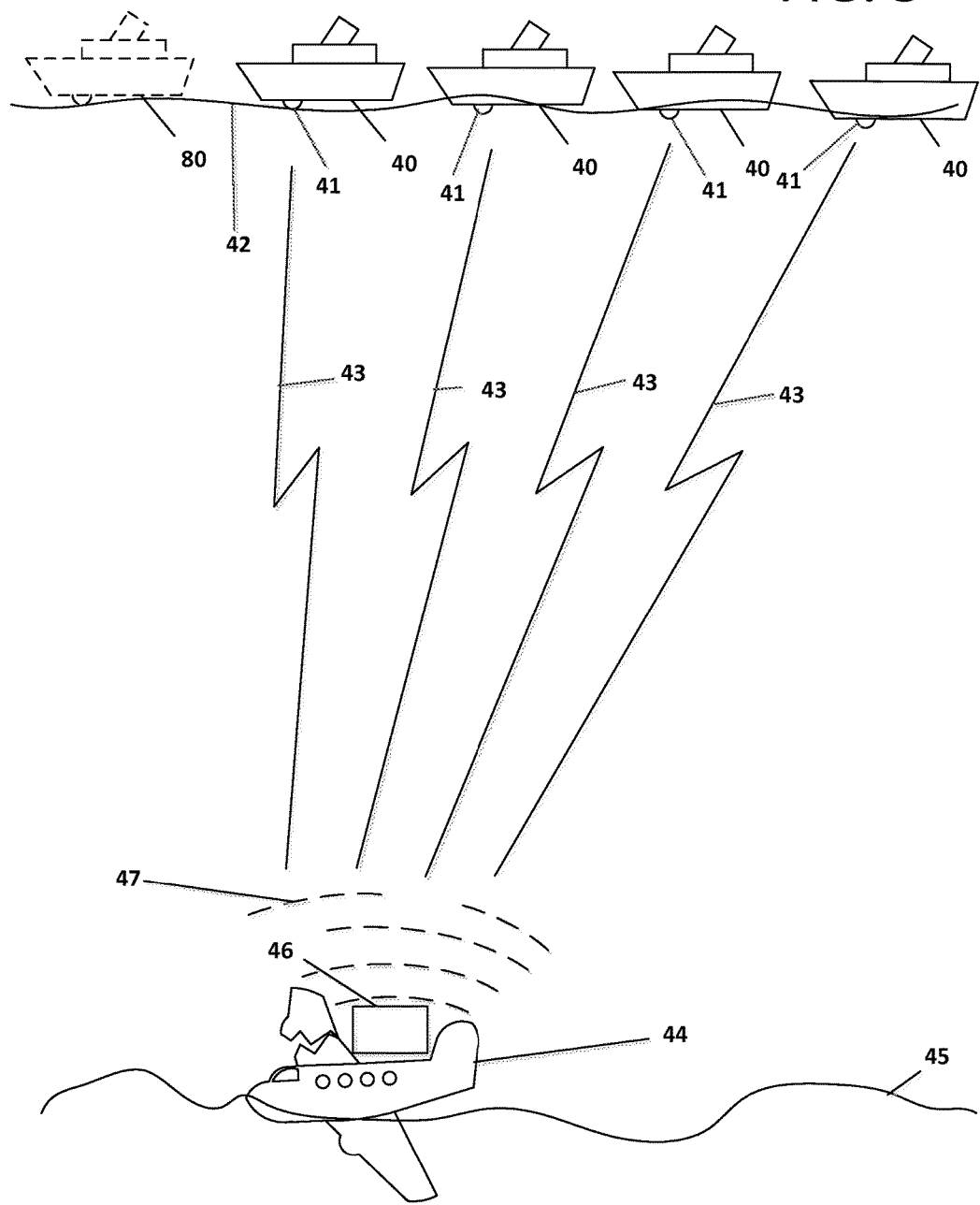
FIG. 5 is an overall elevation of an embodiment and the situation in which it is employed. In this situation a search vessel sends interrogation signals from multiple locations and the target device combines embedded search information from the signals to calculate the relative positions of the target device and the projected position of the search vessel and search device when a ping would be received. It shows search vessels 40, search devices 41, the surface of a large body of water 42, interrogation signals 43, a lost object which in this case is a crashed aircraft 44, the bottom of the body of water 45, a target device 46, a ping signal 47 and the projected position of the search vessel 80.

FIG. 5 adds to the components of FIG. 1 movement of the search vessel in a way to provide interrogation signals from multiple locations. The search vessel is shown in multiple positions by means of solid lines while transmitting interrogation signals. The search vessel is shown in a projected later position with dashed lines.

Referring to FIG. 5, in one embodiment of the current invention, a search vessel 40 with a search device 41 moves sequentially to multiple positions on the surface of the water 42 and emits at each position an interrogation signal 43. The interrogation signals contain embedded seeker information including the time and location at which the signal is transmitted. The interrogation signals are received at the target device 46 located at the lost object 44 which is on the bottom of the water 45. The target device calculates a projected position of the search device 80 at a time when a ping signal 47 is to be scheduled to arrive.

At least four positions are required from interrogation signals received to calculate the relative location of the target device in the coordinate system used in the interrogation signal embedded information. Four equations can be determined from the four search device positions and the four times of transmission and receipt of the interrogation signals. These equations can be solved to produce the values of four unknown variables. Three of these variables are the relative location of the search and target devices in the three coordinate dimensions of space and one is the offset between the two clocks of the search and target devices. Further details of this type of calculation are given in the referenced U.S. Pat. No. 4,613,864 and are the principal method of implementating the well known global positioning system (GPS) reception technology.

Referring to FIG. 3, this embodiment uses the microprocessor 62 to do the calculation of the positions and to further calculate transit times for the signals, a projected position for the search device and a time to transmit a ping signal to arrive at the search device at a time known to the search device. This information is used to control the transmission time of a ping signal and constitutes the modification of a parameter of the ping signal determined by embedded seeker information from the received interrogation pulses. As described in other embodiments, the ability of the search device to predict the arrival time of the ping signal in a narrow time window allows for detection of the ping signal with greater certainty and at a greater range.

Figure 6:
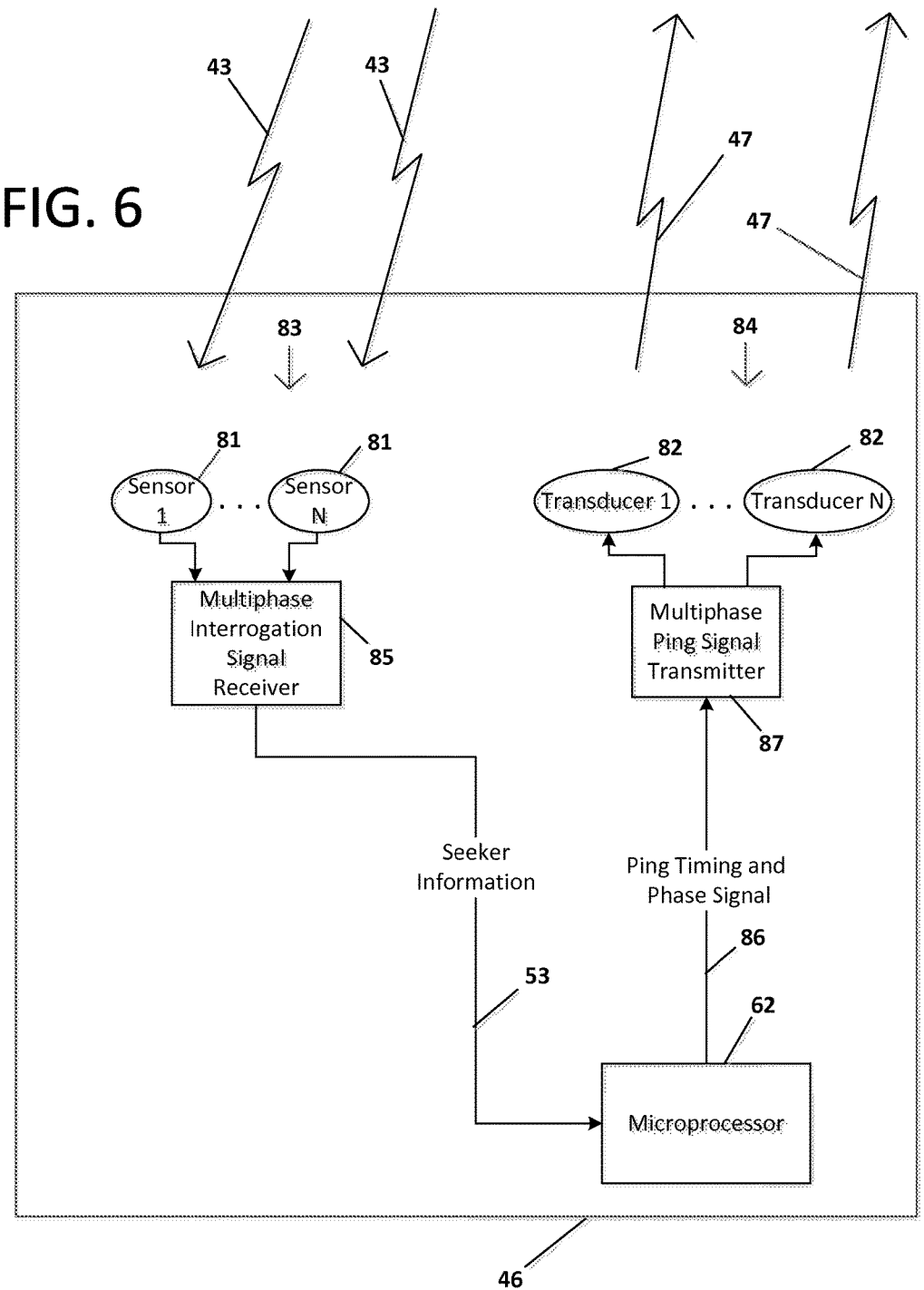
FIG. 6 shows a block diagram of an embodiment which uses multiple sensors and multiple transducers to determine the direction of an interrogation signal and to direct ping signals toward the source of the interrogation signal. It shows an interrogation signal 43, a target device 46, a ping signal 47, transfer of seeker information 53, a microprocessor 62, interrogation signal sensor 81, a ping signal transducer 82, an interrogation signal multi-sensor 83, a ping signal multi-transducer 84, a multiphase interrogation signal receiver 85, a ping timing and phase signal 86, and a multiphase ping signal transmitter 87.

FIG. 6 is a block diagram of the target device of an embodiment which adds multiple sensors and transducers to the components of FIG. 3. Referring to FIG. 6 an interrogation signal 43 is received by interrogation signal sensors 81 located at the target device 46. A plurality of the interrogation signal sensors together constitute an interrogation signal multi-sensor 83 which is connected to a multiphase interrogation signal receiver 85. This receiver extracts relative phase information from each of the sensors and passes that information to the microprocessor 62 as seeker information 53. In a related embodiment the receiver contains electronic or computer circuitry which produces interrogation signal direction information as a function of the phase differences between the sensors and passes information to the microprocessor thereby constituting a means of extracting seeker information.

Multiple ping signal transducers 82 are collectively referred to as the ping signal multi-transducer 87. The sensors and transducers are arranged in locations whose relative coordinates are known to the microprocessor and the processor calculates phase information for use by the transducers to produce a ping signal directed toward the search device. This calculation may be made directly from one set of phase information to the other when the interrogation signal multi-sensor and the ping signal multi-transducer are similarly arrayed in space or may involve calculation of an intermediate set of direction values in the coordinate system of the target device. In a related embodiment not employing a microprocessor, the ping signal transducers may be directly supplied with information extracted from the interrogation signal sensors. The connections passing the ping timing and phase signal 86, and sources providing phase information to the transducers constitute a means of modifying a parameter, in this case direction of emission, of the ping signal by employing seeker information. The ping signal multi-transducer emits a ping signal 47 that is directed toward the search device, which is thereby increased in intensity in that direction and can be detected at an increased distance between the search device and the target device.

FIG. 7 is a block diagram of the target device of an embodiment which adds a interrogation signal multi-sensor and local sensors for acceleration and for pressure to the components of FIG. 3. Referring to FIG. 7 an interrogation signal 43 is received by interrogation signal multi-sensor 83 located at the target device 46. A plurality of the interrogation signal sensors together constitute the interrogation signal multi-sensor and are connected to a multiphase interrogation signal receiver 85. This receiver extracts relative phase information from each of the sensors and passes that information to the microprocessor 62 as seeker information 53.

The microprocessor calculates the direction from which the interrogation signal is received in the coordinate frame of the target device from the relative phases and the known relative positions of the sensors. There is also an accelerometer 91 located at the target device that provides the microprocessor with the direction of the vertical direction established by gravity. This enables the microprocessor to calculate the direction from which the interrogations signal has arrived in a coordinate frame established by gravity. A pressure sensor 92 provides the microprocessor with information sufficient to calculate the depth at which the target device is submerged. In this embodiment the search device is assumed to be on the surface of the body of water and the distance from the search device and thereby the transit time of the signals can be calculated from the depth of the water and the angle from which the interrogation signal arrives with respect to the vertical direction. A ping signal 47 is transmitted by the ping signal transmitter 51 on the basis of control signals 63 at a time to arrive at a predictable delay from the transmission from the interrogation signal based on this transmission time. The search device is thereby enabled to receive the ping signal in a narrow and predictable time window as described in other embodiments with a similar improvement in the ability to detect the ping signal.

It can be seen that there are many other ways to combine interrogation signal information, seeker information and embedded seeker information with information known at the target device from other sources to modify a ping signal and enhance the probability and range of ping signal detection. The principles and spirit of the current inventive concept are envisioned to apply to all forms of information which are produced by combing the information from the interrogation signal with information which is stored or gained from other sources and with any preestablished protocols.

While the drawing and the detailed embodiments primarily illustrate the application of this inventive concept to the case of an aircraft lost in the vast spaces of the ocean, it should be appreciated that other objects of search such as persons trapped by avalanches of snow, or mudslides or in collapsed mines may be in similar situations. Devices to aid in their location may be provided working on these principles.

I claim:

1. A first device configured to be located at an object to aid in the location of the object when the object is lost and submerged comprising:
   a receiver at a submerged depth substantially below a surface configured to receive an interrogation signal when sent from a search second device near the surface; and
   a transmitter at a submerged depth substantially below a surface configured to transmit a ping signal to the search second device in response to the interrogation signal from the search second device; wherein
   a parameter of the ping signal is modified as a function of at least one of the parameters of the interrogation signal to substantially increase the distance between the search second-device and the transmitter across which the search second device can detect the ping signal from the distance between the search second device and the transmitter across which than the search second device can detect a ping signal from the transmitter using the parameter without the modification.

2. The device of claim 1 wherein:
   a parameter of the ping signal is modified by scheduling a ping signal to be transmitted to arrive at the search second device at a predetermined delay from the time of transmission of the interrogation signal that increases the probability of ping detection at the search second device.

3. The device of claim 1 wherein:
   the submerged object is a vehicle submerged in water at a depth of more than 1 mile; and
   the ping signal is an acoustic signal.

4. The device of claim 1 further comprising:
   a microprocessor; and
   a multi-element sensor array wherein:
   the microprocessor calculates a direction of arrival of the interrogation signal and employs the direction as a determinate of the modification of the parameter of the ping signal.

5. The device of claim 4 wherein:
   the device directs the ping signal toward a search second device.

6. The device of claim 1 wherein:
   a parameter of the ping signal is modified to direct a ping signal in a direction that increases the probability of ping detection at the search second device so that the search second device can detect the ping signal at an increased distance between the device and the search second device.

7. A first device configured to be located at an object to aid in the location of the object when the object is lost and submerged comprising:
   a receiver at a submerged depth substantially below a surface configured to receive information when sent from a search second device near the surface comprising encoded information encoded in an interrogation signal; and
   a transmitter at a submerged depth substantially below a surface configured to transmit a ping signal to the search second device in response to the interrogation signal from the search second device; wherein:
   a parameter of the ping signal is modified as a function of the encoded information to substantially increase the distance between the search second-device and the transmitter across which the search second device can detect the ping signal from the distance between the search second device and the transmitter across which than the search second device can detect a ping signal from the transmitter using the parameter without the modification.

8. The device of claim 7 wherein:
   a parameter of the ping signal is modified by scheduling a ping signal to be transmitted to arrive at the search second device at a predetermined delay from the time of transmission of the interrogation signal that increases the probability of ping detection at the search second device.

9. The device of claim 8 wherein:
   the submerged object is a vehicle submerged in water at a depth of more than 1 mile; and
   the ping signal is an acoustic signal.

10. The device of claim 7 wherein:
    the information is encoded in an interrogation signal; further comprising: a microprocessor.

11. The device of claim 10; wherein:
    the ping signal is modified by applying ping signal parameters that are determined as a function of a request by a search second device.

12. The device of claim 10; further comprising:
    an absolute time clock.

13. The device of claim 10 wherein:
    the microprocessor employs the encoded information to calculate a time for transmission of the ping signal; whereby
    a search second device is enabled to predict a time of arrival of the ping signal.

14. The device of claim 10; wherein:
    the microprocessor employs the encoded information to calculate a relative location of the search second device to the device.

15. A device comprising:
    a transmitter to transmit an interrogation signal wherein:
    information is encoded and transmitted configured to be used by the device of claim 4 to modify a ping signal so that a search second device can detect the ping signal at an increased distance between the device and the search second device as a function of said encoded information.

16. A device comprising:
    a receiver to receive a ping signal located at a search second device; and
    a means to predict the arrival time of a ping signal transmitted by the device of claim 4 wherein:

the prediction is based on a modification to a parameter of a ping signal made by the target device as a function of the information encoded and embedded in an interrogation signal.

17. A method for facilitating location of a target first device located at a lost and submerged object; comprising:
extracting encoded information from the interrogation signal when an interrogation signal sent from a search second device near the surface is received by the target first device at a submerged depth substantially below a surface; and
transmitting from a transmitter at a submerged depth substantially below a surface a ping signal to the search second device in response to the interrogation signal from the target device with at least one parameter of the ping signal determined at least in part by the extracted encoded information to help the search second device determine the presence of the target device.

18. The method of claim 17 further comprising:
determining the transit time of the interrogation signal from the absolute time of transmission; and
scheduling a ping signal to be transmitted to arrive at the search second device at a predetermined delay from the time of transmission of the interrogation signal that increases the probability of ping detection at the search second device
wherein:
the encoded information in the interrogation signal includes an absolute time of transmission of the interrogation signal; and
the ping signal has a time of transmission determined at least in part by the encoded information.

19. The method of claim 17 further comprising:
determining the location of the target device based at least in part on information encoded in at least one interrogation signal;
determining the transit time of the interrogation signal from relative locations of the search second device and the target device; and
scheduling a ping signal to be transmitted to arrive at the search second device at a predetermined delay that increases the probability of ping detection at the search second device
wherein:
the encoded information in the interrogation signal includes the location of the search second device; and
the ping signal has a time of transmission determined at least in part by the encoded information.

20. The method of claim 17 wherein:
the information encoded in the interrogation signal comprises a request for specified parameter values of a ping signal; and
the parameters of the ping signal are determined at least in part by the request.

* * * * *